United States Patent
Kim et al.

(10) Patent No.: US 9,386,506 B2
(45) Date of Patent: Jul. 5, 2016

(54) METHOD FOR PROVIDING CONNECTION TYPE INFORMATION AND METHOD FOR CONTROLLING RADIO RESOURCE OF HOME (E)NODEB

(75) Inventors: Hyun-Sook Kim, Gyeonggi-Do (KR); Lae-Young Kim, Gyeonggi-Do (KR); Tae-Hyeon Kim, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 354 days.

(21) Appl. No.: 13/264,176

(22) PCT Filed: May 3, 2010

(86) PCT No.: PCT/KR2010/002806
§ 371 (c)(1),
(2), (4) Date: Oct. 13, 2011

(87) PCT Pub. No.: WO2010/128786
PCT Pub. Date: Nov. 11, 2010

(65) Prior Publication Data
US 2012/0039214 A1 Feb. 16, 2012

(30) Foreign Application Priority Data
Aug. 31, 2009 (KR) .......................... 10-2009-0081535

(51) Int. Cl.
*H04W 12/00* (2009.01)
*H04W 48/18* (2009.01)
(Continued)

(52) U.S. Cl.
CPC ............... *H04W 48/02* (2013.01); *H04L 12/14* (2013.01); *H04L 12/1457* (2013.01); *H04L 12/66* (2013.01); *H04W 48/08* (2013.01); *H04W 84/045* (2013.01)

(58) Field of Classification Search
USPC .................................................. 370/310–338
See application file for complete search history.

(56) References Cited

U.S. PATENT DOCUMENTS

2002/0187801 A1* 12/2002 Vanghi .......................... 455/522
2007/0105568 A1   5/2007 Nylander et al.
(Continued)

FOREIGN PATENT DOCUMENTS

CN           101136826 A    3/2008
KR   10-2007-0099849 A    10/2007

OTHER PUBLICATIONS

3GPP, ZTE, 'HNB Access Mode handling procedure', 3GPP TSG-RAN WG3 Meeting #63bis, Seoul, Korea, Mar. 23-26, 2009, 5 pages, R3-090760.
(Continued)

Primary Examiner — Brandon Renner
(74) Attorney, Agent, or Firm — Birch, Stewart, Kolasch & Birch, LLP (57) ABSTRACT

A method for providing connection type information in a network entity comprises: receiving, by the network entity, a connection request message including access mode information indicating at least one of an open access mode, a closed access mode, and a hybrid access mode, from a Home (e)NodeB having received a request from a terminal; determining, by the network entity, a connection type of the terminal based on the access mode information and the terminal's subscriber information; and transmitting, by the network entity, a connection accept message including information about the determined connection type, to the Home (e)NodeB, such that the Home (e) NodeB performs a radio resource control function with respect to the connection with the terminal.

7 Claims, 6 Drawing Sheets

(51) Int. Cl.
  *H04W 48/02* (2009.01)
  *H04L 12/14* (2006.01)
  *H04L 12/66* (2006.01)
  *H04W 48/08* (2009.01)
  *H04W 84/04* (2009.01)

(56) References Cited

U.S. PATENT DOCUMENTS

| | | |
|---|---|---|
| 2008/0020745 A1 | 1/2008 | Bae et al. |
| 2009/0043902 A1 | 2/2009 | Faccin |
| 2009/0070694 A1 | 3/2009 | Ore et al. |
| 2009/0305699 A1* | 12/2009 | Deshpande ............ H04W 48/16 455/434 |
| 2010/0112980 A1* | 5/2010 | Horn et al. ..................... 455/411 |
| 2010/0240366 A1* | 9/2010 | Bi et al. ...................... 455/435.1 |
| 2010/0267388 A1* | 10/2010 | Olsson .......................... 455/436 |
| 2011/0269468 A1* | 11/2011 | Sundell et al. ................ 455/436 |
| 2011/0274051 A1* | 11/2011 | Vikberg ................. H04L 63/101 370/328 |

OTHER PUBLICATIONS

3GPP TSG-RAN WG3#64, Huawei, "Discussion on Admission Control," San Francisco, USA, May 4-8, 2009, 3 pages, R3-091090.

* cited by examiner

| Information acquired by MME | Acquisition Methods |
|---|---|
| Configuration information of Home (e)NodeB (e.g., access mode, i.e., open mode, closed mode, hybrid mode) | Acquisition during Attach/TAU procedure |
| | Receiving notification when configuration information is changed by network operator or H(e)NB's user. |
| | Indirectly analogizing from other information, or indirectly analogize from information obtained from other network. |
| | Acquire by request from specific network node. |
| CSG ID-related information of UE | Acquire CSG ID-related information when acquiring subscriber information from HSS. |
| TAI list for UE's paging | Acquire from MME where TAI list has been stored, or from network node. |
| Network operator policy or Home (e)NodeB's owner policy | Receive through PCRF Interaction (Interface between MME and PCRF), or through gateway. |
| | Receive through interface between H(e)NB and MME, e.g., S1 AP-based message. |

METHOD FOR PROVIDING CONNECTION TYPE INFORMATION AND METHOD FOR CONTROLLING RADIO RESOURCE OF HOME (E)NODEB

This application is a National Phase of PCT/KR2010/002806 filed of May 3, 2010,which claims priority under 35 U.S.C. 119(e) to U.S. Provisional Application No. 61/175,059 filed May 04, 2009 and under 35 U.S.C. 119(a) to Republic of Korea Patent Application No. 10-2009- 0081535 filed on Aug. 31, 2009, all of which are hereby expressly incorporated by reference into the present application.

TECHNICAL FIELD

The present invention relates to a mobile communication system, and particularly, to a Home(e)NodeB system in a mobile communication system.

BACKGROUND ART

In the field of 3GPP that regulates technical standards of the third generation mobile communication system, since the end of 2004, has started researches for Long Term Evolution/System Architecture Evolution (LTE/SAE) techniques to optimize and enhance functions of 3GPP techniques in correspondence to a plurality of forums and new techniques relevant to the 4th generation mobile communication.

The SAE based on the 3GPP SA WG2 relates to a network technique for determining a network structure and supporting mobility of a heterogeneous radio network system with cooperating with an LTE operation of the 3GPP TSG RAN. The SAE, one of the most important standardization issues of the 3GPP, is implemented to develop a 3GPP system into a system that supports various wireless access techniques based on IP (Internet Protocol). More concretely, the SAE has been implemented for an optimized packet-based system capable of minimizing transmission delay with an enhanced data transmission capability.

A conceptual reference model of the SAE, defined by 3GPP SA WG2 includes a non-roaming case, and a roaming case having various scenarios. Details of the conceptual reference model can be referred from TS 23.401 and TS 23.402 which are 3GPP standard documents. This may be schematically reconfigured in FIG. 1.

Figure 1:
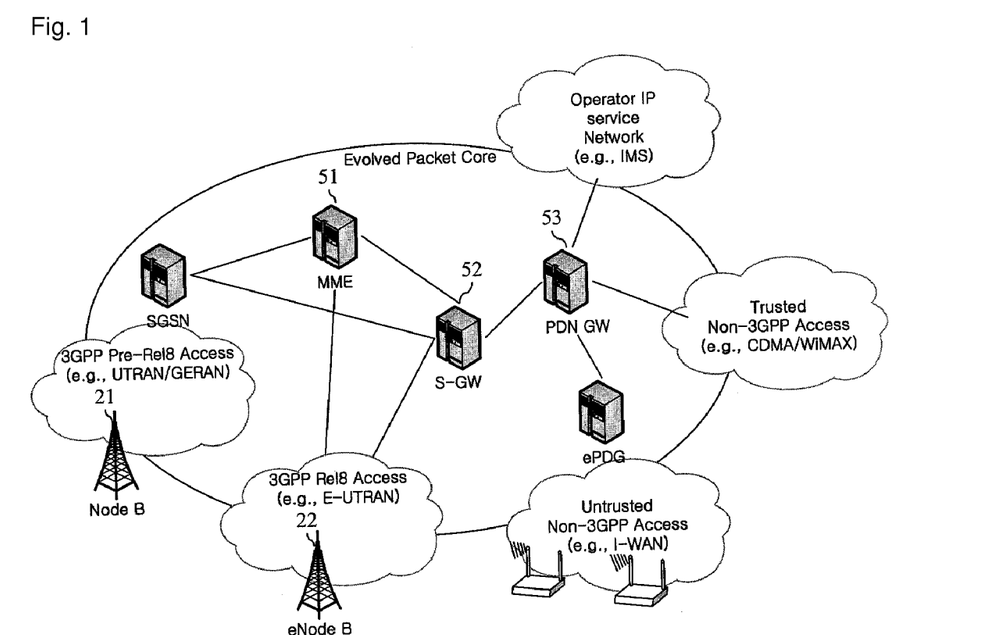
FIG. 1 is a structural view of an evolved mobile communication network.

FIG. 1 is a structural view of an evolved mobile communication network.

One of the most representative characteristics of the network of FIG. 1 is that a structure is based on a two-layer model (2 Tier Model), an evolved NodeB (so-called eNodeB) of an Evolved UTRAN and a Gateway of a Core Network. The eNodeB has similar functions to them of both an RNC and a NodeB of the conventional UMTS system. And, the Gateway has a similar function to it of the conventional SGSN/GGSN.

Another important characteristic of the network is that a Control Plane and a User Plane between an Access Network and a Core Network are interchanged to each other through different interfaces. In the conventional UMTS system, one interface (Iu) exists between an RNC and an SGSN. However, since a Mobility Management Entity (MME) which processes a control signal is separated from a Gateway (GW), two interfaces (i.e, S1-MME and S1-U) were respectively used.

Figure 2:
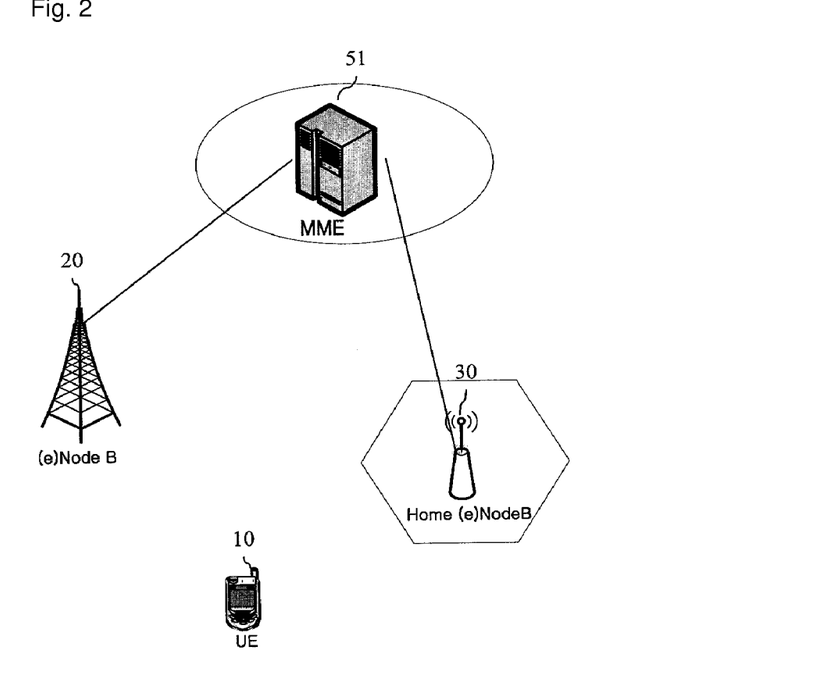
FIG. 2 shows an (e)NodeB and a Home (e)NodeB.

FIG. 2 shows an (e)NodeB and a Home (e)NodeB.

In the $3^{rd}$ or $4^{rd}$ generation mobile communication system, efforts to increase a cell capacity have been ongoing in order to support high-capacity service such as multimedia contents and streaming, and a bi-directional service.

As various techniques for transmitting a large amount of data in addition to multimedia relating techniques are required, many methods for increasing wireless capacity have been researched. One of the methods include a method for allocating frequency resources as much as possible. However, there have been limitations in allocating limited frequency resources to a plurality of users as much as possible.

In order to increase a cell capacity, there are efforts to use a high frequency bandwidth, but this causes to reduce a cell radius. When cells having a small radius, such as pico cells are used, a frequency bandwidth of the cell can increase highly than that in the conventional cellular system thus to transmit more information. However, in this case, more base stations have to be installed in the same area, which results in high costs.

In order to increase a cell capacity by using a small cell, a femto-base station such as a Home (e)NodeB has been proposed.

Referring to FIG. 2, an (e)NodeB 20 may correspond to a macro-base station, whereas a Home (e)NodeB 30 may correspond to a femto-base station. In the specification, the terms will be explained based on the 3GPP. And, the (e)NodeB 20 will be used so as to indicate 'NodeB' or 'eNodeB', and the Home (e)NodeB 30 will be used so as to indicate 'Home NodeB' or 'Home eNodeB'.

A cell of the Home (e)NodeB 30 is implemented in an Open Access Mode, a Closed Access Mode, and a Hybrid Access Mode according to an access permission policy.

In the case of the Open Access mode, the cell of the Home (e)NodeB 30 provides service to all serviceable terminals without limitations.

In the case of the Closed Access mode, the cell of the Home (e)NodeB 30 permits access of only allowed terminals.

In UMTS/EPS of the 3GPP standard, it has been proposed that one or more Home (e)NodeBs operated in the Closed Access mode forms one Closed Subscriber Group (CSG). That is, one CSG may be composed of one or more Home (e)NodeBs, and the terminal also receives one permission (e.g., one CSG membership) to access the cells of the Home (e)NodeBs. Here, the terminal may have one or more CSG memberships to access one or more CSGs, and may have time information allowed according to each CSG. Information on accessible CSGs is called as an Allowed CSG List. This allowed CSG list is stored in the terminal, and a network entity such as MME, SGSN, MSC, HSS, and HLR. The Home (e)NodeB may support one or more CSGs.

Figure 3:
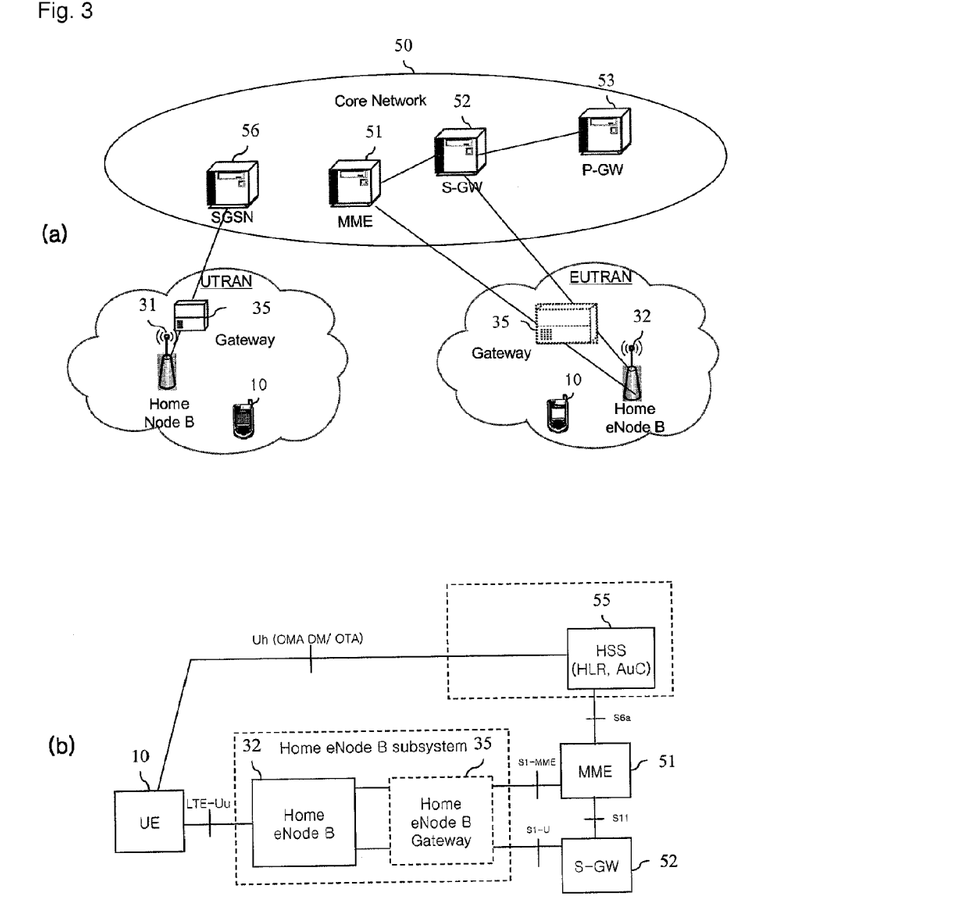
FIG. 3 is an exemplary view showing a structure of a network including a Home eNodeB.

FIG. 3 is an exemplary view showing a structure of a network including a Home eNodeB.

As shown in FIG. 3A, a core network 50 includes an MME 51, a Serving Gateway (S-GW) 52, an SGSN 56, a Packet Data Network Gateway (P-GW) or a PDN Gateway 53. The core network 50 may further include a PCRF 54 and an HSS 55.

FIG. 3A shows a Home NodeB 31 based on a UMTS Terrestrial Radio Access Network (UTRAN), and a Home eNodeB 32 based on an Evolved-UTRAN (E-UTRAN). The Home NodeB 31 based on a UTRAN is connected to the SGSN 56 through a gateway 35. The Home eNodeB 32 based on an E-UTRAN is connected to the MME 51 and the S-GW 52. Here, a control signal is transmitted to the MME 51, and a user data signal is transmitted to the S-GW 52. The gateway 35 may be disposed between the Home eNodeB 32 based on an E-UTRAN and the MME 51.

FIG. 3B shows an interface of the Home eNodeB 32 based on an E-UTRAN. The Home eNodeB 32 based on an E-UT- RAN and the gateway 35 are referred to as a Home eNodeB sub-system. The Home eNodeB 32 based on an E-UTRAN is connected to a UE 10 through an LTE-Uu interface. The Home eNodeB 32 and the MME 51 are connected to each other through an S1-MME interface. The Home eNodeB 32 and the S-GW 52 are connected to each other through an S1-U interface. The S1-MME interface and the S1-U interface may pass through the gateway 35. The MME 51 and the S-GW 52 are connected to each other through an S11 interface. And, the MME 51 and the HSS 55 are connected to each other through an S6a interface.

Figure 4:
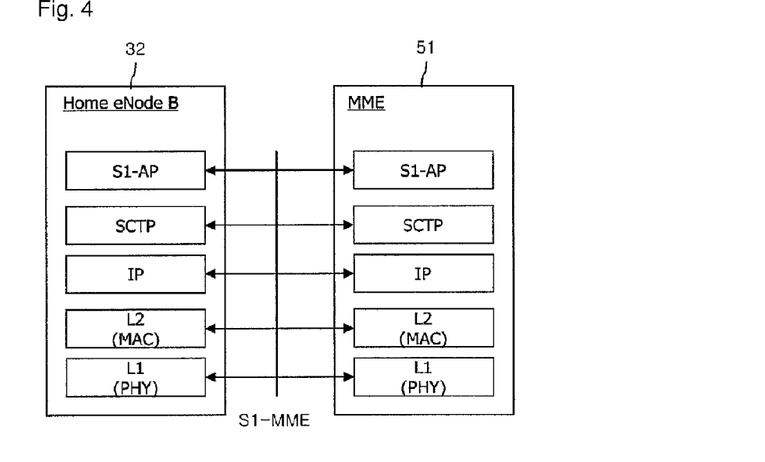
FIG. 4 is an exemplary view showing an interface between the Home eNodeB and an MME of FIG. 3 as a protocol stack.

FIG. 4 is an exemplary view showing an interface between the Home eNodeB 32 and the MME 51 of FIG. 3 as a protocol stack.

As shown in FIG. 4, each of the Home eNodeB 32 and the MME 51 includes a first layer (physical layer), a second layer (media access control layer), a third layer (Internet Protocol (IP) layer), Signaling Control Transmission Protocol (SCTP), and S1 Application Protocol (S1-AP).

The S1-AP is an application layer protocol between the Home eNodeB 32 and the MME 51. The SCTP ensures transmission of a signaling message between the Home eNodeB 32 and the MME 51.

In the related art, when the Home (e)NodeB 30 is operated in a Hybrid Access Mode and the UE 10 requests access to the Home (e)NodeB 30, the Home (e)NodeB 30 is not provided with information about whether the MME 51 has permitted access of the UE 10 to the Home (e)NodeB 30 as a CSG member or a non-CSG member. This may cause the Home (e)NodeB 30 not to know a connection type of the UE 10 thereto, and not to control radio resources.

More concretely, since the Home (e)NodeB 30 is not capable of identifying a connection type of the UE 10, can not be preformed other policies between the CSG member and the non-CSG member, i.e., radio resource controls such as rate control or diversion of establishment connection.

DISCLOSURE OF INVENTION

Solution to Problem

Therefore, an object of the present invention is to provide a method capable of allowing a Home (e)NodeB operated in a hybrid connection mode to be provided with information about a connection type of a UE thereto at the time of initial attach, location update, or handover.

Another object of the present invention is to provide a method capable of performing radio resource controls such as rate control or diversion of establishment connection, based on a connection type of a UE to a Home (e)NodeB.

According to one aspect of the present invention, there is provided a method capable of directly or indirectly providing information about a connection type of a UE to a Home (e)NodeB, to an access network such as the Home (e)NodeB, by a core network such as an MME, when performing initial Attach, location update (e.g., Tracking Area update, Routing Area update, and Location Area update), and handover.

According to another aspect of the present invention, there is provided a method capable of maintaining information about a connection type of a UE to a Home (e)NodeB by an entity of a core network or an access network, and capable of performing radio resource controls such as rate control or diversion of establishment connection.

To achieve these and other advantages and in accordance with the purpose of the present invention, as embodied and broadly described herein, there is provided a method for providing connection type information in a network entity, the method comprising: receiving, by the network entity, a connection request message including access mode information indicating at least one of an open access mode, a closed access mode, and a hybrid access mode, from a Home (e)NodeB having received a request from a terminal; determining, by the network entity, a connection type of the terminal based on the access mode information and the terminal's subscriber information; and transmitting, by the network entity, a connection accept message including information about the determined connection type, to the Home (e)NodeB, such that the Home (e) NodeB performs a radio resource control function with respect to the connection with the terminal.

To achieve these and other advantages and in accordance with the purpose of the present invention, as embodied and broadly described herein, there is also provided a method for controlling radio resources in a Home(e)NodeB system, the method comprising: receiving, by the Home(e)NodeB, a connection request message from a terminal; transmitting a connection request message including access mode information indicating at least one of a open access mode, a closed access mode, and a hybrid access mode, to a network entity, in response to the received connection request message; receiving, by the Home(e)NodeB, a connection accept message including information about an allowed connection type of the terminal, from the network entity; establishing, by the Home(e)NodeB, a connection with the terminal in response to the received connection accept message; and performing, by the Home(e)NodeB, a radio resource control function with respect to the established connection based on the received connection type information.

The Connection Request message may be an Attach Request message, or an Area Update Request message. The Area Update Request message may include at least one of a Tracking Area Update Message, a Routing Area Update Message, and a Location Area Update Message.

The radio resource control may include at least one of rate control and diversion of establishment connection.

The connection type information may include at least one of an indicator indicating acceptance as a CSG member, and an indicator indicating acceptance as a Non-CSG.

The network entity may be a Mobile Management Entity (MME).

The present invention may have the following advantages.

Firstly, the Home (e)NodeB operated in a hybrid connection mode may be provided with information about a connection type of the UE thereto at the time of initial attach, location update, or handover.

Furthermore, a radio resource control such as rate control and diversion of establishment connection may be performed based on the connection type of the UE to the Home (e)NodeB.

The foregoing and other objects, features, aspects and advantages of the present invention will become more apparent from the following detailed description of the present invention when taken in conjunction with the accompanying drawings.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Description will now be given in detail of the present invention, with reference to the accompanying drawings.

For the sake of brief description with reference to the drawings, the same or equivalent components will be provided with the same reference numbers, and description thereof will not be repeated.

The present invention is applied to a Home (e)NodeB system. The Home (e)NodeB indicates a Home NodeB and a Home eNodeB. However, the present invention is not limited to this, but may be applied to all communication systems and methods to which the techniques of the present invention are applicable.

Unless differently defined, all the terms used herein with including technical or scientific terms have the same meaning as terms generally understood by those skilled in the art relating to the field of the present invention. Terms defined in a general dictionary should be understood so as to have the same meanings as contextual meanings of the related art. Unless definitely defined in the present invention, the terms are not interpreted as ideal or excessively formal meanings. Furthermore, when the technical terms used in the present invention are unsuitable technical terms that do not precisely express the techniques of the present invention, the unsuitable technical terms should be replaced by suitable technical terms that can be understood by those skilled in the art. The general terms used in the present invention should be interpreted based on the previous or next contexts, but should not be interpreted as an excessively narrowed meaning.

A singular expression includes a plural concept unless there is a contextually distinctive difference therebetween. In the present invention, a term of "include" or "have" should not be interpreted as if it absolutely includes a plurality of components or steps of the specification. Rather, the term of "include" or "have" may not include some components or some steps, or may further include additional components.

Though terms of 'first', 'second', etc. are used to explain various components, the components are not limited to the terms. The terms are used only to distinguish one component from another component. For example, a first component may be referred to as a second component, or similarly, the second component may be referred to as the first component within the scope of the present invention.

When it is mentioned that one component is "connected" or "accessed" to another component, it may be understood that the one component is directly connected or accessed to the another component or that still other component is interposed between the two components. In the meantime, when it is mentioned that one component is "directly connected" or "directly accessed" to another component, it may be understood that no component is interposed therebetween.

Hereinafter, preferred embodiments of the present invention will be explained in more detail with reference to the attached drawings. The same or similar components of one embodiment as or to those of another embodiment will be provided with the same or similar reference numerals, and their detailed explanations will be omitted. And, if it is regarded that detailed descriptions of the related art are not within the range of the present invention, the detailed descriptions will be omitted.

For explanatory clarity, the specification is disclosed based on 3GPP EUTRAN/EPC. However, the present invention may not limited to this.

Especially, a specific network entity is disclosed based on EUTRAN/EPC, which refers to an MME. However, this specific network may be extended to other second network entity (e.g. Home (e)NodeB gateway, etc.) configured to determine paging. Furthermore, the Home (e)NodeB gateway (a node between a Home (e)NodeB and a core network) is disclosed based on an omitted network structure. However, the Home (e)NodeB gateway may be extended to be also used in an existing network structure in a similar manner.

Hereinafter, the term of a 'mobile terminal' will be used. The mobile terminal may be also referred to as a user equipment (UE), a mobile equipment (ME), and a mobile station (MS). The UE may be a mobile device having a communication function, such as a portable phone, a PDA, a smart phone, and a notebook. Also, the UE may be an immobile device such as a PC and a vehicle mounted device.

Definition of Terms

Hereinafter, the terms used in the present invention will be briefly defined for understanding.

UMTS: An abbreviation of a Universal Mobile Telecommunication System, which signifies the $3^{rd}$ generation mobile communication network.

EPS: An abbreviation of an Evolved Packet System, which signifies an efficient core network that supports Evolved RAN by evolving a core network of the conventional 3GPP system architecture, and that simplifies a network entity so as to enhance efficiency of a packet network.

NodeB: A base station of a UMTS network, which has a cell coverage size corresponding to a macro cell.

eNodeB: A base station of an EPS network, which has a cell coverage size corresponding to a macro cell.

(e)NodeB: A term indicating a NodeB and an eNodeB.

Home NodeB: A base station of a UMTS network, which has a cell coverage size corresponding to a femto cell. This accesses a 3GPP-based UE to a mobile operator's network through a UTRAN wireless air interface.

Home eNodeB: A base station of an EPS network, which has a cell coverage size corresponding to a femto cell. This accesses a 3GPP-based UE to a mobile operator's network through an E-UTRAN wireless air interface.

Home (e)NodeB: A term indicating a Home NodeB and a Home eNodeB.

Home (e)NodeB gateway: A gateway performing an interfacing with a core network by being connected to one or more Home(e)NodeBs.

Home (e)NodeB sub-system: In a network structure where the Home (e)NodeB gateway is implemented together, a sub-system that manages a wireless network by combing a Home (e)NodeB and a Home (e)NodeB gateway as one set. The Home (e)NodeB sub-system and the Home (e)NodeB manage a wireless network, and are interworked with a core network. Therefore, the Home (e)NodeB sub-system and the Home (e)NodeB may be considered as one set. Accordingly, the terms of the Home (e)NodeB and the Home (e)NodeB sub-system will be used together.

Closed Subscriber Group (CSG): A specific membership group based on subscriber's information so as to permit access of only allowed UEs to a cell of the Home (e)NodeB.

Open Access Mode: A term indicating that the Home (e)NodeB operates in the same manner as a normal cell (non-CSG cell) having no concept of a CSG. That is, a term indicating that the Home (e)NodeB operates in the same manner as a general (e)NodeB.

Closed Access Mode: A term indicating that the Home (e)NodeB operates as a CSG cell. A term indicating that the Home (e)NodeB operates to permit access of only allowed UEs to the corresponding cell. That is, a term indicating that only UEs having priorities of specific CSG IDs supported by the Home (e)NodeB are accessible to the Home (e)NodeB.

Hybrid Access Mode: A term indicating that the Home (e)NodeB operates as a CSG cell, but allows access of even a non-CSG subscriber. The Home (e)NodeB can permit accesses from UEs having specific IDs thereby to provide a service to the UEs. Furthermore, the Home (e)NodeB operated in Hybrid Access Mode permits accesses from UEs having no CSG ID.

CSG Cell: A cell of a Public Land Mobile Network (PLMN), to which only members of the CSG group can access. For this, the CSG cell broadcasts a CSG ID. CSG cells which share the same ID can be identified or managed as one group for mobility management and charging.

CSG ID: An identifier broadcast by the CSG cell, which is used to facilitate access by an authorized member of the CSG. The CSG ID may be unique within only one PLMN.

Tracking Area: A unit of an area to track the location of a UE 100 operated in an idle mode. That is, a unit of an area to register the location of the UE 100. An ID of a specific area is referred to as a Tracking Area Identity (TAI). In an EPS, the UE can simultaneously register its location to a plurality of TAIs for efficient mobility management when the UE is in an idle mode. In this case, a TAI list is managed.

TAI LIST: Location information registered to an HSS or an HLR through a mobility management entity (MME) as the location of the UE is moved, i.e., a set of an (e)NodeB or a Home (e)NodeB.

PCC (Policy and Charging Control): An operation for an operator's policy and charging.

PCRF (Policy and Charging Rule Function): A functional network element having a policy of an operator for performing the PCC, and a charging rule. The PCRF provides an operator policy and a charging rule to another node.

Rate Control: An operation to control a Quality of Service (QoS) such as a bandwidth of a bearer, according to a policy or according to whether the UE is a CSG member or a non-CSG member.

Diversion of Establishment Connection: An operation to divert the established communication via the current Home (e)NodeB to other Home (e)NodeB (other CSG cell) or an (e)NodeB (non-CSG cell) which manages a macro cell, for service continuity, in a case that a service can not be provided from the current Home (e)NodeB.

Hereinafter, the method according to the present invention will be explained in more detail with reference to the attached drawings.

Figure 5:
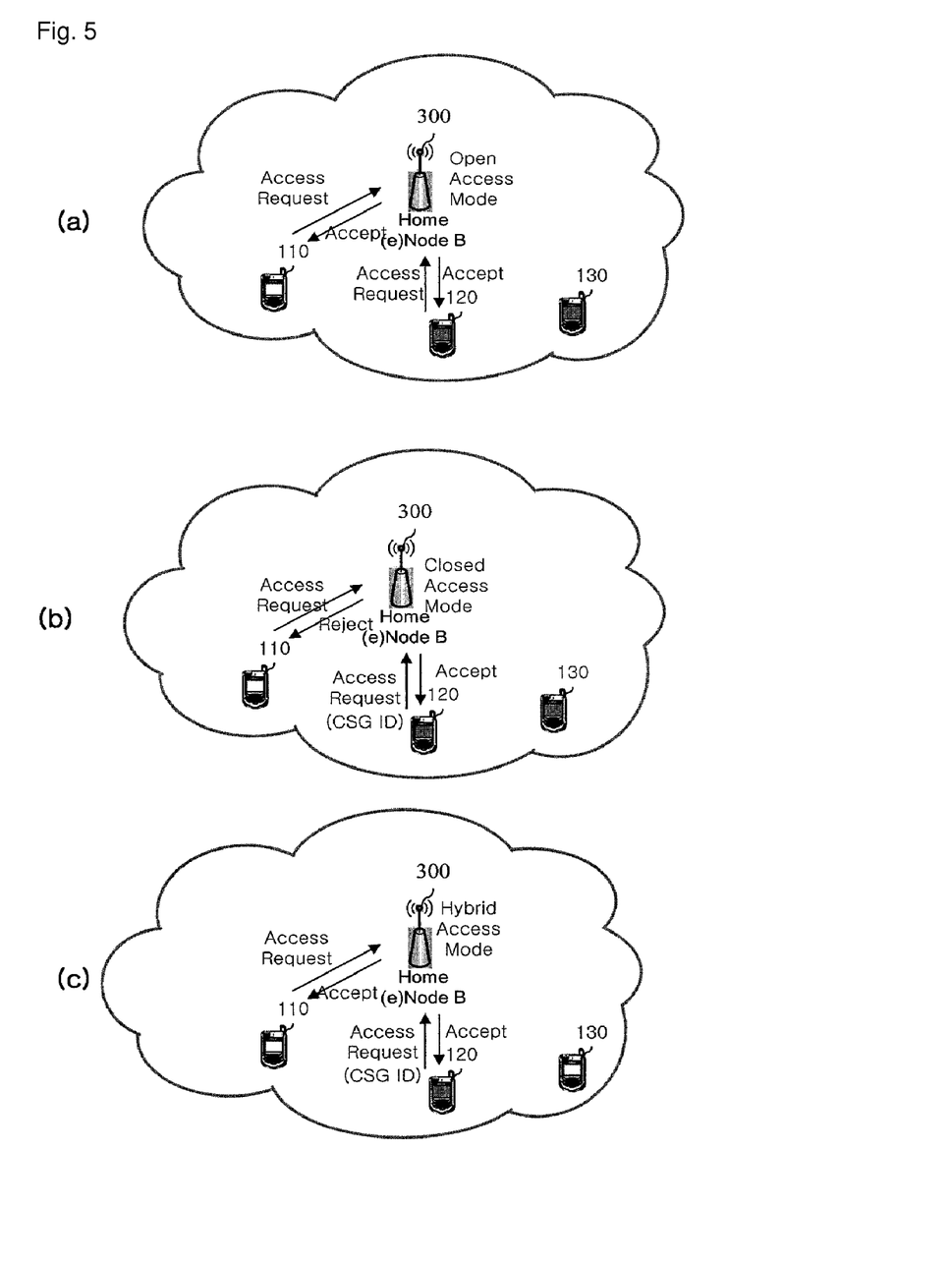
FIG. 5 is an exemplary view showing operation modes of a Home (e)NodeB according to the present invention.

FIG. 5 is an exemplary view showing operation modes of the Home (e)NodeB according to the present invention.

The aforementioned femto base station, e.g., the Home (e)NodeB 300 may operate in the Open Access Mode of as illustrated in FIG. 5A, the Closed Access Mode of as illustrated in FIG. 5B, and the Hybrid Access Mode of as illustrated in FIG. 5C.

FIG. 5A shows an example of the open access mode. As aforementioned, the open access mode indicates that all UEs are accessible to a cell of the Home (e)NodeB 300. Accordingly, a plurality of UEs 110, 120 and 130 are allowed to access to the cell of the Home (e)NodeB 300.

FIG. 5B shows an example of the closed access mode. The closed access mode indicates that the Home (e)NodeB 300 operates as a CSG cell. That is, only allowed UEs are accessible to the Home (e)NodeB 300. The Home(e)NodeB 300 has a CSG ID. Each user receives an allowance according to each CSG.

FIG. 5C shows an example of the hybrid access mode. The hybrid access mode indicates that the Home (e)NodeB 300 operates as a CSG cell that provides service to CSG members, but access of a UE, a non-CSG member, to the Home (e)NodeB 300 can also be allowed. For instance, even if the first UE 110 is not a CSG member (in other words, the first UE 110 doesn't have a proper CSG ID), the first UE 110 can access to the Home (e)NodeB 300.

Figure 6:
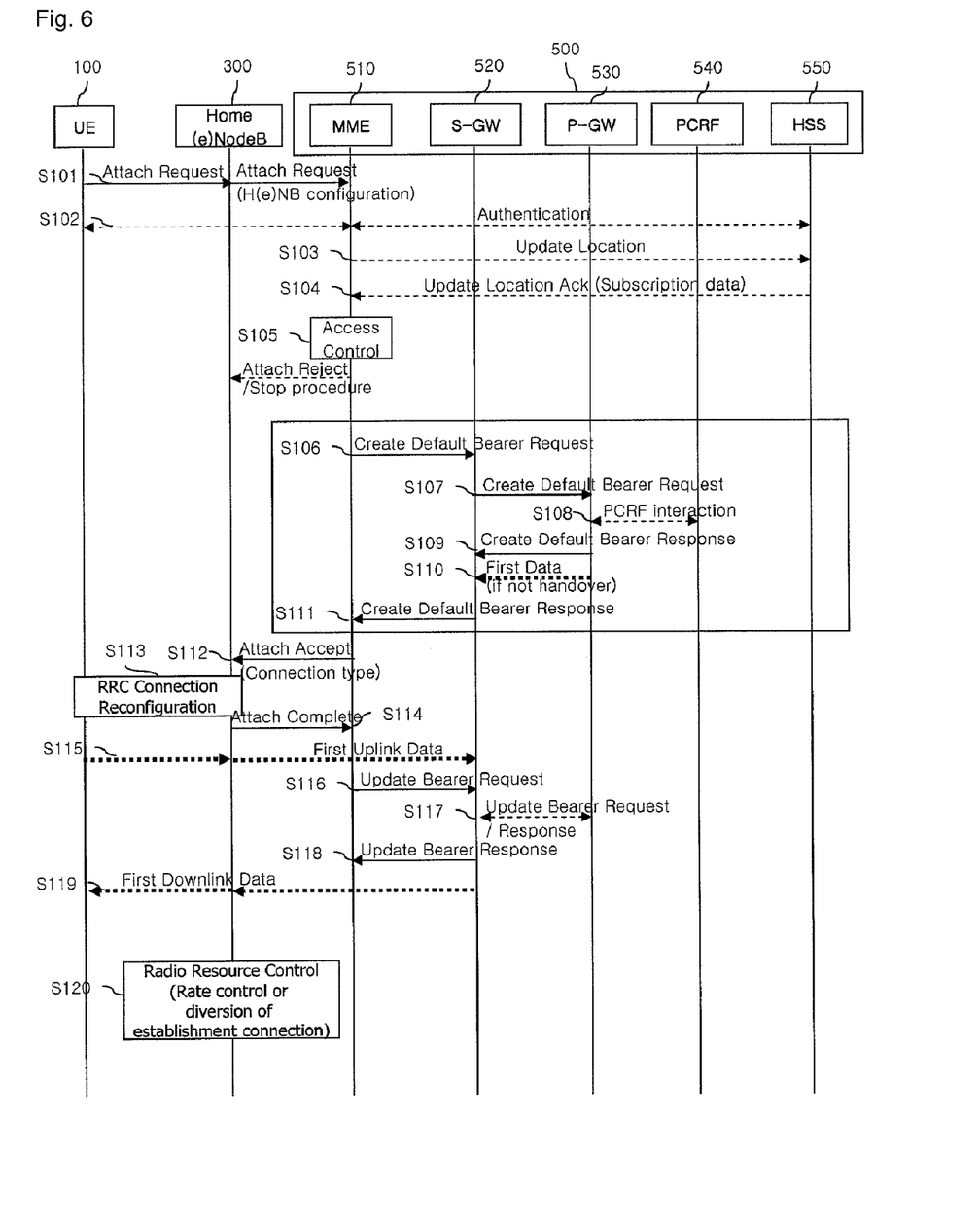
FIG. 6 is a flowchart showing a method for providing connection type information and a method for controlling access according to a first embodiment of the present invention.
Figure 7:
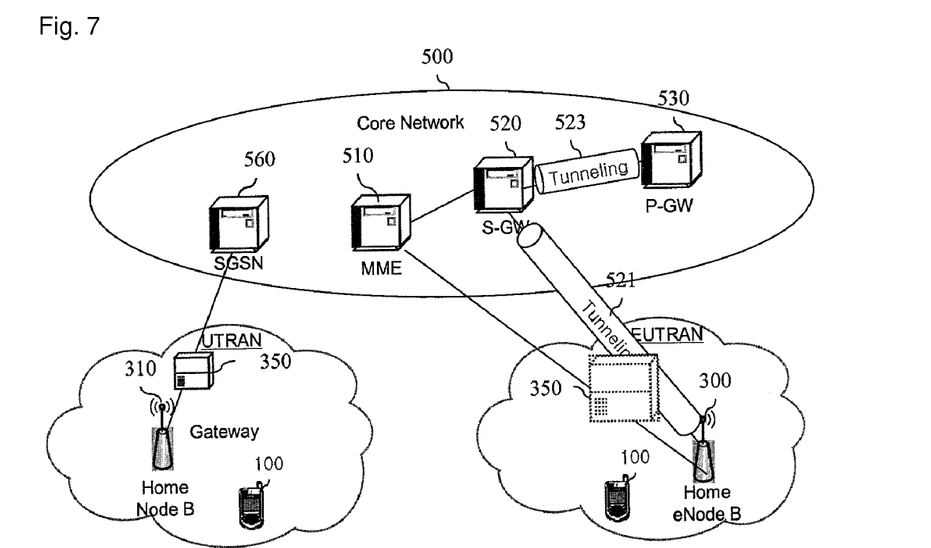
FIG. 7 is an exemplary view showing a bearer (tunnel) established according to the method shown in FIG. 6.

FIG. 6 is a flowchart showing a method for providing connection type information and a method for controlling access according to a first embodiment of the present invention, and FIG. 7 is an exemplary view showing a bearer (tunnel) established according to the method shown in FIG. 6.

1) Firstly, the UE 100 transmits an Attach Request message to the Home (e)NodeB 300 (101).

The Attach Request message is a message transmitted by the UE when performing an initial attach, such as turning on power of the UE, roaming, or handover.

Figure 8:
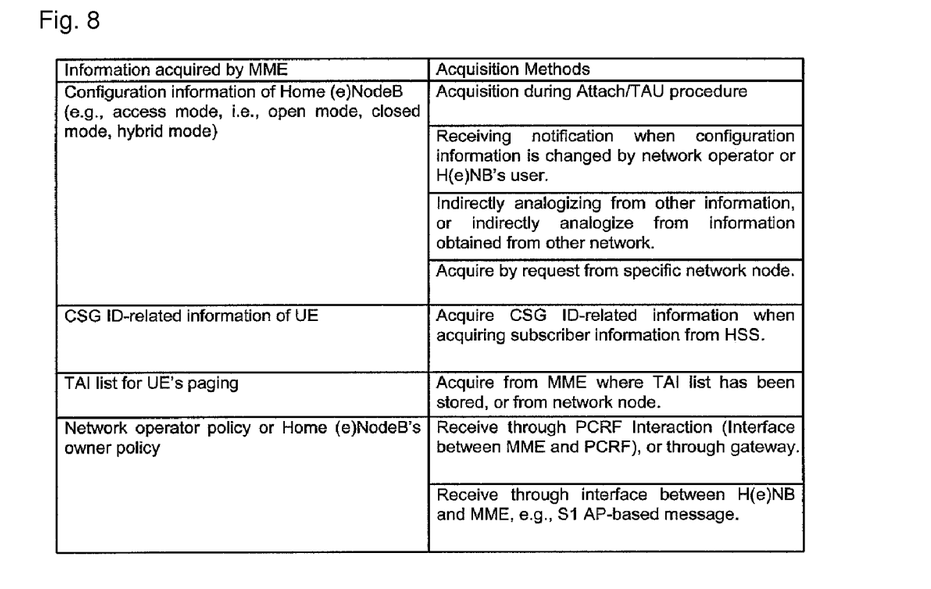
FIG. 8 is a table showing information acquired by an MME and information acquiring methods according to the present invention.

Then, the Home (e)NodeB 300 receives the Attach Request message, and transmits the received Attach Request message to the MME 510 with including its configuration (or settings) information, i.e., general establishment information, and access mode information (open access mode, closed access mode, and hybrid access mode). This method is referred to as a direct acquisition method, in which the MME 510 obtains the access mode information as the Home (e)NodeB 300 transmits the access mode information to the MME 510 with including in the Attach Request message. As shown in FIG. 8, the MME 510 may obtain the access mode information through an indirect acquisition method.

The configuration information may include at least one of a plurality of information shown in the following table 1.

TABLE 1

(1) General configuration information
(2) CSG-related information (e.g., CSG ID, allowable access list)
(3) Access mode information
Information about one mode of Open Access mode, Closed Access mode, and Hybrid Access mode In table 1, it is shown that the access mode information explicitly indicates one mode of Open Access mode, Closed Access mode, and Hybrid Access mode. However, the access mode information implicitly indicates the mode. For example, if the CSG ID and the access mode information are not presented in the configuration information, the open access mode is considered. Also, if the CSG ID is presented, but the access mode information is not presented, the closed mode will be considered.

As shown in FIG. 8, the MME 510 may acquire a plurality of information, which will be later explained.

2) Next, the UE 100 performs an authentication procedure to the HSS 550 (S102). The MME 510 transmits a request message such as an Update Location message for request update of the location of the UE 100 to the HSS 550 if necessary (S103). Then, the MME 510 receives a response message such as an Update Location ACK message (S104). Here, the response message includes subscriber information of the UE 100, e.g., whether the UE 100 is a member of a CSG (in this case, expire information, etc. may be included), CSG ID information, etc.

3) Then, the MME 510 performs an access control (S105). More concretely the MME 510 determines whether to accept the Attach Request from the UE 100, based on the configuration information obtained from the Home (e)NodeB 300 and at least one of a plurality of information obtained by the methods shown in FIG. 8. In the case of accepting the Attach Request, the MME 510 determines a connection type.

For instance, if it is determined, based on the information, that the Home (e)NodeB 300 is operated in a closed access mode and the UE 100 is a non-CSG member, the MME 510 rejects the Attach Request from the UE 100 and completes the current procedures. Alternatively, if it is determined, based on the information, that the Home (e)NodeB 300 is operated in a hybrid access mode and the UE 100 is a CSG member, the MME 510 accepts the UE 100 as a CSG member. Still alternatively, if it is determined the UE 100 is a non-CSG member, the MME 510 accepts the UE 100 as a non-CSG member.

4) Once the Attach Request from the UE 100 has been accepted, the MME 510 sets (establishes) a tunnel with an S-GW 520 and a P-GW 530. More concretely, the MME 510 transmits a bearer creation request message, e.g., a Create Default Bearer Request message, to the S-GW 520 (S106). Then, the S-GW 520 transmits the received bearer creation request message (e.g., the Create Default Bearer Request message) to the P-GW 530 (S107). The P-GW 530 selectively performs a PCRF interaction with a PCRF 540 (S108). Here, the P-GW 530 may obtain a network operator policy through the PCRF Interaction. The P-GW 530 transmits a bearer creation response message, e.g., a Create Default Bearer Response message, to the S-GW 520 (S109). Accordingly, as shown in FIG. 7, a tunnel (e.g., a default bearer 523) is created between the S-GW 520 and the P-GW 530, and a Tunnel Endpoint ID (TEID) for data transfer is exchanged therebetween. The TEID is a parameter serving as an address for transmission and reception of data. Here, the bearer creation response message (e.g., Create Default Bearer Response message) may include the aforementioned network operator policy. When the P-GW 530 has downloaded date to be transmitted to the UE 100, the P-GW 530 may transmit the downloaded data to the S-GW 520 through the created bearer (S110). The S-GW 520 transmits the bearer creation response message (e.g., Create Default Bearer Response message) to the MME 510 (S111). The Create Default Bearer Response message may include a TEID of the S-GW 520.

5) The MME 510 transmits an Attach Accept message, to the Home (e)NodeB 300 (S112).

The Attach Accept message may include connection type information. The connection type information may include one of two information shown in the following table 2.

TABLE 2

(1) Acceptance as a CSG member
When the Home (e)NodeB is operated in a closed access mode or a hybrid TABLE 2-continued access mode, and when the UE requesting access is a CSG member that can receive a service from the Home (e)NodeB, the UE is accepted as a CSG member.
(2) Acceptance as a Non-CSG member
When the Home (e)NodeB is operated in a hybrid access mode, and when the UE requesting access is not a CSG member that can receive a service from the Home (e)NodeB, the UE is accepted as a non-CSG member.

The Attach Accept message may further include the TEID, and triggers a wireless bearer setup between the Home (e)NodeB 300 and the UE 100.

6) The Home (e)NodeB 300 and the UE 100 executes an RRC connection procedure (S113). The Home (e)NodeB 300 transmits a message informing that the attach has been completed, e.g., Attach Complete message to the MME 510 (S114). Accordingly, as shown in FIG. 7, a tunnel 521 is set between the UE 100 and the S-GW 520. The UE 100 can transmit its uplink data to the S-GW 520 through the Home (e)NodeB 300 (S115). The Attach Completion message includes a TEID of the Home (e)NodeB 300.

For update of the established default bearer 523 of FIG. 7, the MME 510 transmits a request message for requesting an update of the bearer, e.g., a bearer update request message, to the S-GW 520 (S116). The request message (e.g., Update Bearer Request message) includes the TEID of the Home (e)NodeB 300. The S-GW 520 delivers the request message (e.g., the Update Bearer Request message) to the P-GW 530, and the P-GW 530 transmits a response message, e.g., an Update Bearer Response message to the S-GW 520 (S117). Then, the S-GW 520 transmits delivers the response message to the MME 520 (S118). Once the established default bearer 523 is updated through these procedures, the S-GW 520 transmits downlink data to the UE 100 through the Home (e)NodeB 300 (S119).

8) The Home (e)NodeB 300 provides a service to the UE 100.

9) Then, the Home (e)NodeB 300 performs a radio resource control based on the received connection type information (S120).

More concretely, the Home (e)NodeB 300 performs a radio resource control such as rate control or diversion of establishment connection, according to the received connection type information. For instance, when the Home (e)NodeB does not have sufficient resources, the Home (e)NodeB 300 may set a QoS of a UE corresponding to a non-CSG member to be lower than a QoS of a UE corresponding to a CSG member. When performing data scheduling, the Home (e)NodeB 300 may configure such that data to be transmitted to the UE corresponding to the non-CSG member has a low priority. Alternatively, when a service from the Home (e)NodeB 300 can not be provided to the UE 100 any longer due to expiration or termination of a CSG membership of the UE 100, the Home (e)NodeB 300 may handover the UE 100 to other Home (e)NodeB (i.e., other CSG cell) or an (e)NodeB (non-CSG cell) which manages a macro cell. Still alternatively, when the Home (e)NodeB 300 can not provide a service to the UE 100 any longer due to its deficient radio resources, the Home (e)NodeB 300 may handover the UE 100 to other Home (e)NodeB (i.e., other CSG cell) or an (e)NodeB (non-CSG cell) which manages a macro cell, rather than disrupt the current service.

FIG. 8 is a table showing information acquired by the MME and information acquiring methods according to the present invention.

Referring to FIG. 8, the plurality of information obtained by the MME 510 includes at least one of configuration information (including access mode information) of the Home (e)NodeB 300, information relating to the UE's CSG ID, TAI(s), and a network operator policy or a policy of an owner of the Home (e)NodeB 300.

The configuration information of the Home (e)NodeB 300 includes access mode information indicating that the Home (e)NodeB 300 operates in which access mode among the open access mode, the closed access mode, and the hybrid access mode. This configuration information (including the access mode information) may be obtained from the Home (e)NodeB 300 while the UE 100 tries to attach to the Home (e)NodeB 300, or during a TAU procedure. Alternatively, the configuration information (including the access mode information) may be obtained by the MME 510 when being changed by a network operator or an owner of the Home (e)NodeB 300. In another alternative manner, the configuration information (including the access mode information) may be obtained from other information acquired by the MME 510 in an analogical manner, or may be obtained from information acquired by other network entity in an indirect analogical manner. In another alternative manner, the configuration information (including the access mode information) may be obtained according to a request of the MME 510 from other second network entity, e.g., an additional second network entity where the configuration information (including the access mode information) of the Home (e)NodeB has been stored.

The information relating to the UE's CSG ID may be obtained when the MME 510 obtains a specific UE's subscriber information from the HSS 550.

The TAI(s) may be directly stored in the MME 510, or may be obtained from other second network, e.g., the HSS, etc.

The network operator policy may be received through PCRF interaction between the MME 510 and PCRF, or may be obtained through a gateway. The policy of an owner of the Home (e)NodeB may be obtained through an S1 AP interface with the Home (e)NodeB 300.

Figure 9:
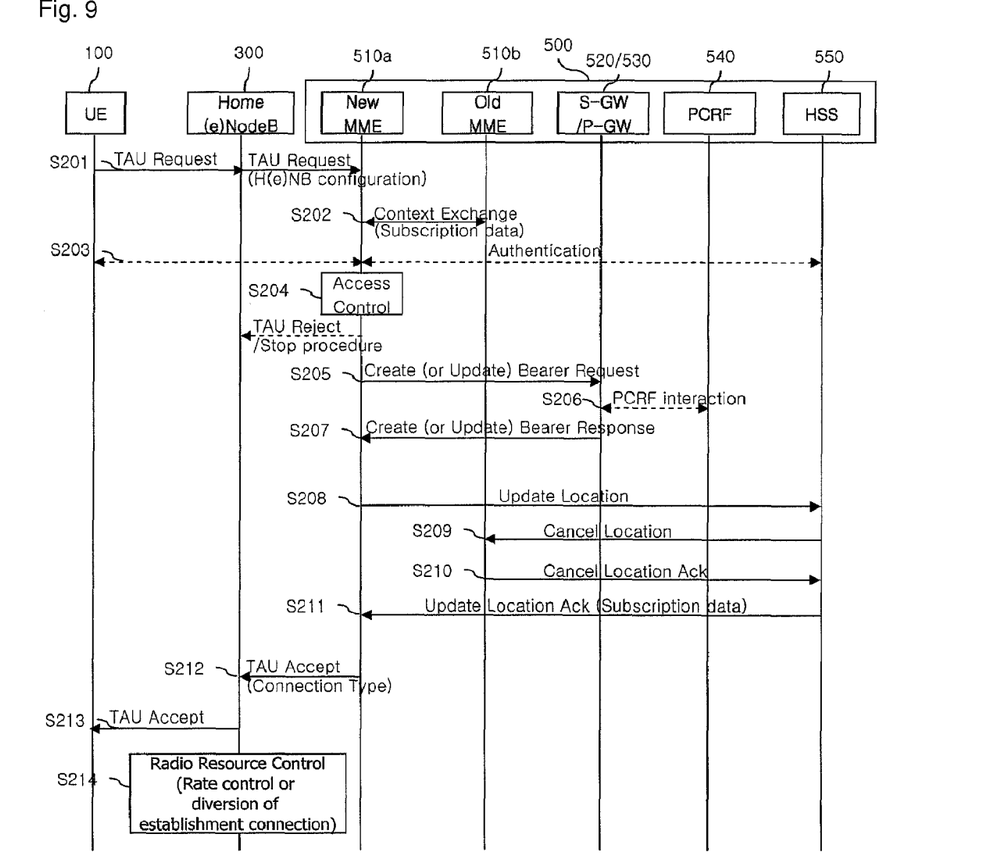
FIG. 9 is a flowchart showing a method for providing connection type information and a method for controlling access according to a second embodiment of the present invention.

FIG. 9 is a flowchart showing a method for providing connection type information and a method for controlling access according to a second embodiment of the present invention. The procedures shown in FIG. 9 are similar to those shown in FIG. 6. Therefore, only different procedures from those of FIG. 6 will be explained hereinafter, and explanations about similar procedures to those of FIG. 6 will be omitted.

1) The UE 100 transmits an Area Update Request message to the Home (e)NodeB 300 (S201).

The Area Update Request message is transmitted when the UE in an idle mode registers its location to a new MME 510a due to a location change, etc. This Area Update Request message may be a Tracking Area Update (TAU) message, a Routing Area Update (RAU) message, and a Location Area Update (LAU) message.

The Home (e)NodeB 300 may receive the Area Update Request message, and may transmit the received Area Update Request message to the new MME 510a with including therein its configuration information, i.e., access mode information (open access mode, closed access mode, and hybrid access mode). The configuration information may include at least one of information shown in the table 1.

2) The new MME 510a transmits, to an old MME 510b which has previously managed the UE 100, a message requesting a context of the UE 100 (e.g., bearer-related information and subscriber information), and then receives relevant information from the old MME 510b (S202). Here, the relevant information may include CSG ID Information.

3) The UE 100 performs an authentication procedure to the HSS 550 (S203).

4) The new MME 510a performs an access control (S204). For instance, the new MME 510a may reject the Area Update Request to stop the current procedure, or may accept the Area Update Request. This is similar to S105 of FIG. 6, and thus its detailed explanations will be omitted.

5) The new MME 510a transmits, to the S-GW 520 and the P-GW 530 a bearer creation request message (e.g., Create Bearer Request message), or a bearer update request message (e.g., Update Bearer Request message) (S205). Here, the bearer creation request message or the bearer update request message may be exchanged between the S-GW 520 and the P-GW 530 if necessary. S205~S207 are similar to S106~S109 of FIG. 6, and thus their detailed explanations will be omitted.

6) The new MME 510a transmits, to the HSS 550, a location update request message, e.g., Update Location message, in order to update a location of the UE 100 (S208). Then, the HSS 550 transmit, to the old MME 510b, a location deletion message, e.g., Cancel Location message (S209). Then, the old MME 510b transmits, to the HSS 550, a location deletion response message, e.g., Cancel Location Ack message (S210). The HSS 550 transmits, to the new MME 510a, a location update response message, e.g., Update Location Ack message (S211). Here, the location update response message may include subscriber information of the UE 100. The subscriber information may include CSG ID information of the Home (e)NodeB 300. Alternatively, the subscriber information may include subscriber information of the UE 100, e.g., whether the UE 100 is a CSG member (expire time information may be included), CSG ID information, etc.

7) The new MME 510a transmits, to the Home (e)NodeB 300, an Area Update Accept message, e.g., Tracking Area Update (TAU) Accept message, Routing Area Update (RAU) Accept message, Location Area Update (LAU) Accept message (S212). The Area Update Accept message may include connection type information. The connection type information may include one of the two information shown in the aforementioned table 2.

8) Then, the Home (e)NodeB 300 transmits the Area Update Accept message to the UE 100 (S213).

9) The Home (e)NodeB 300 provides a service to the UE 100.

10) Then, the Home (e)NodeB 300 may perform a radio resource control based on the received connection type information (S214). This procedure is similar to S120 of FIG. 6, and thus its detailed explanations will be omitted.

Figure 10:
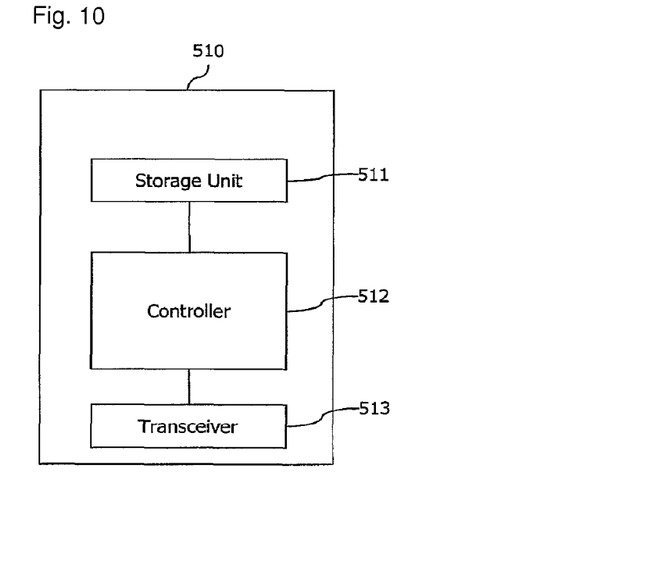
FIG. 10 is a block diagram of the MME according to the present invention.

FIG. 10 is a block diagram of the MME 510 according to the present invention.

Referring to FIG. 10, the MME 510 includes a storage means 511, a controller 512, and a transceiver 513 (transmitting and receiving unit).

The storage means 511 stores software programs including the method shown in FIGS. 6 to 9.

The controller 512 controls the storage means and the transceiver 513, respectively. More concretely, the controller executes software programs including the method, and stored in the storage means. And, the controller transmits the aforementioned signals through the transceiver.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A method for providing connection type information in a mobile management entity (MME), the method comprising:
   receiving, by the MME from a Home (e)NodeB, an attach request message, the Home (e)NodeB having received an attach request from a user equipment (UE), wherein the attach request message includes a closed subscriber group (CSG) ID and an access mode of the Home (e)NodeB, when the Home (e)NodeB is a hybrid cell, and wherein the attach request message includes a CSG ID but does not include an access mode of the Home (e)NodeB, when the Home (e)NodeB is not a hybrid cell;
   transmitting, by the MME, an update location request message to a home subscriber server (HSS);
   receiving, by the MME from the HSS, an update location acknowledgement (ACK) message including the UE's subscriber information;
   determining, by the MME, whether the UE is a CSG member or a non-CSG member based on the access mode information and the UE's subscriber information, if the Home (e)NodeB is a hybrid cell and the Home (e)NodeB has received the attach request from the UE; and
   transmitting, by the MME to the Home (e)NodeB, a Connection accept message including an information indicating whether the UE is the CSG member or the non-CSG member when the Home (e)NodeB is the hybrid cell and the Home (e)NodeB has received the attach request from the UE, such that the Home (e)NodeB performs a radio resource control function according to a CSG membership of the UE.

2. The method of claim 1, wherein the radio resource control comprises at least one of rate control and diversion of establishment connection.

3. A method for controlling radio resources in a Home (e)NodeB system, the method comprising:
   receiving, by the Home (e)NodeB, an attach request from a user equipment (UE);
   transmitting, by the Home (e)NodeB to a mobile management entity (MME), an attach request message, in response to the received attach request message, wherein the attach request message includes a closed subscriber group (CSG) ID and access mode of the Home (e)NodeB, when the Home (e)NodeB is a hybrid cell, and wherein the attach request message includes a CSG ID but does not include an access mode of the Home (e)NodeB, when the Home (e)NodeB is not a hybrid cell;
   receiving, by the Home (e)NodeB, a connection accept message including an information indicating whether the UE is the CSG member or the non-CSG member when the Home (e)NodeB is the hybrid cell and the Home (e)NodeB has received the attach request from the UE, from the MME;
   establishing, by the Home (e)NodeB, a connection with the UE in response to the received connection accept message; and
   performing, by the Home (e)NodeB, a radio resource control function with respect to the established connection based on the received indication,
   wherein the radio resource control function includes, if the UE is the non-CSG member due to a CSG membership of the LIE being terminated, performing, by the Home (e)NodeB, a handover for the UP to another non-CSG cell.

4. The method of claim 3, wherein the radio resource control comprises at least one of rate control and diversion of establishment connection.

5. The method of claim 3, wherein the radio resource control function further includes, if the UE is the CSG member and the Home (e)NodeB has deficient radio resources, performing, by the Home (e)NodeB, a handover for the UE to other CSG cell.

6. The method of claim 3, wherein the radio resource control function further includes, if the UE is the CSG member and the Home (e)NodeB has deficient radio resources, releasing, by the Home (e)NodeB, a handover for the UE to a non-CSG cell.

7. The method of claim 1, wherein the MME is a new MME changed from an old MME due to a movement of the UE.

* * * * *